(No Model.)
P. BUTLER.
IMPLEMENT FOR PACKING CARTRIDGES.
No. 312,809. Patented Feb. 24, 1885.
5 Sheets—Sheet 1.
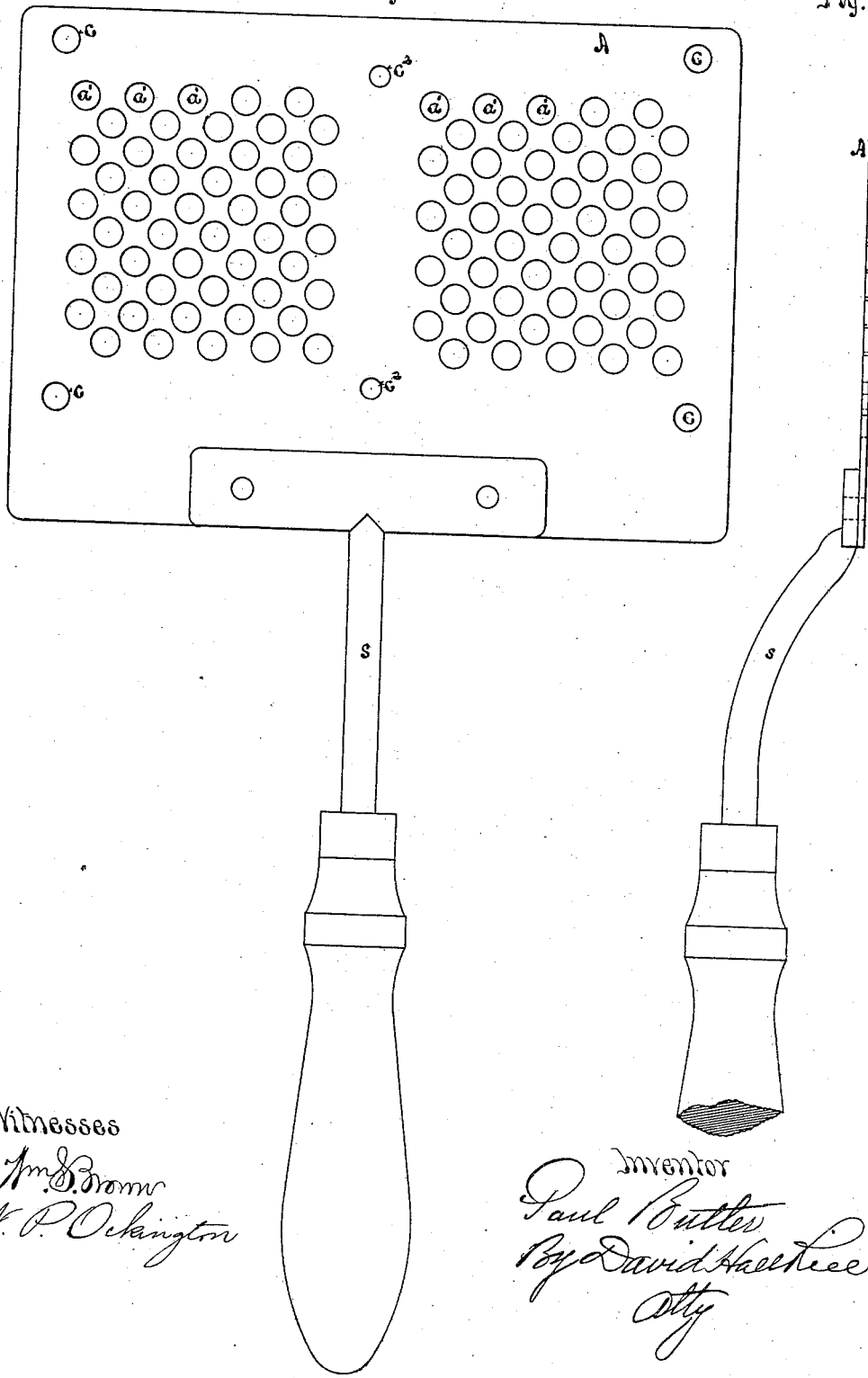

(No Model.) 5 Sheets—Sheet 2.
P. BUTLER.
IMPLEMENT FOR PACKING CARTRIDGES.
No. 312,809. Patented Feb. 24, 1885.
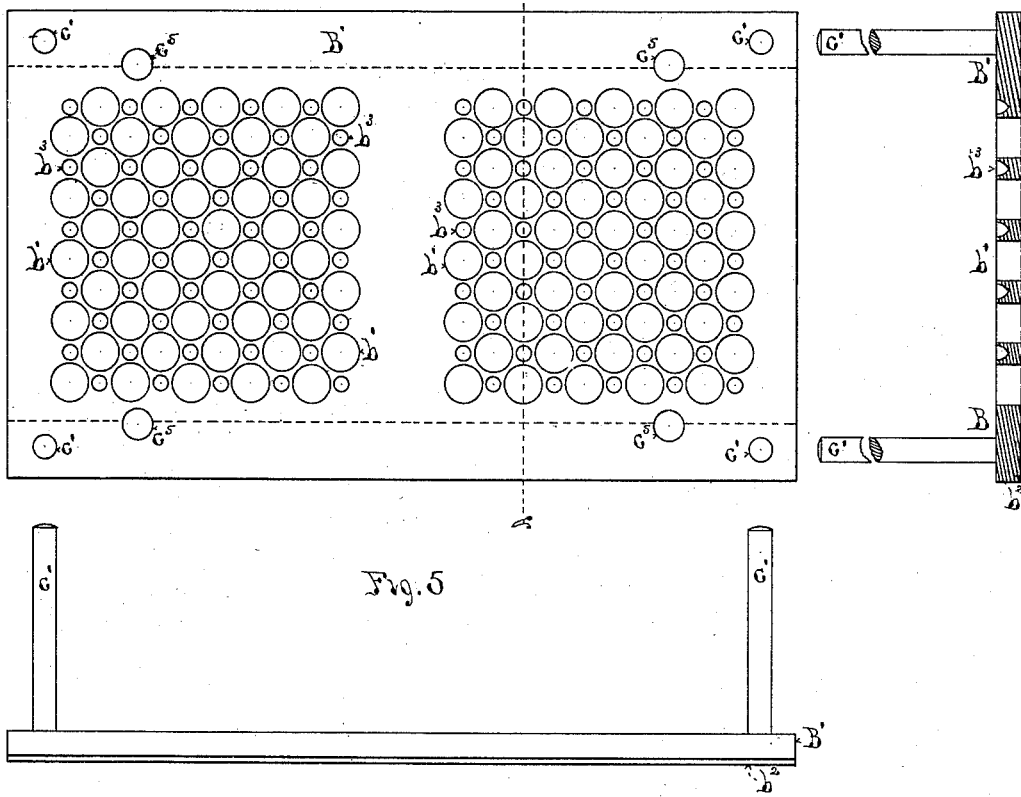
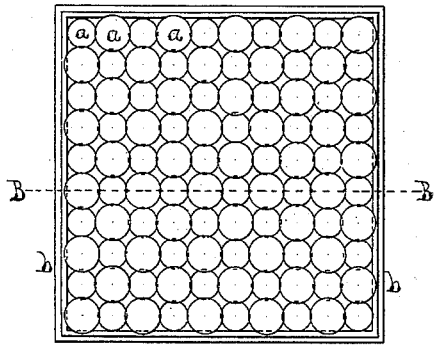
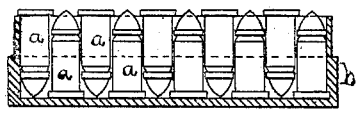
Witnesses Inventor (No Model.) 5 Sheets—Sheet 3.
P. BUTLER.
IMPLEMENT FOR PACKING CARTRIDGES.
No. 312,809. Patented Feb. 24, 1885.
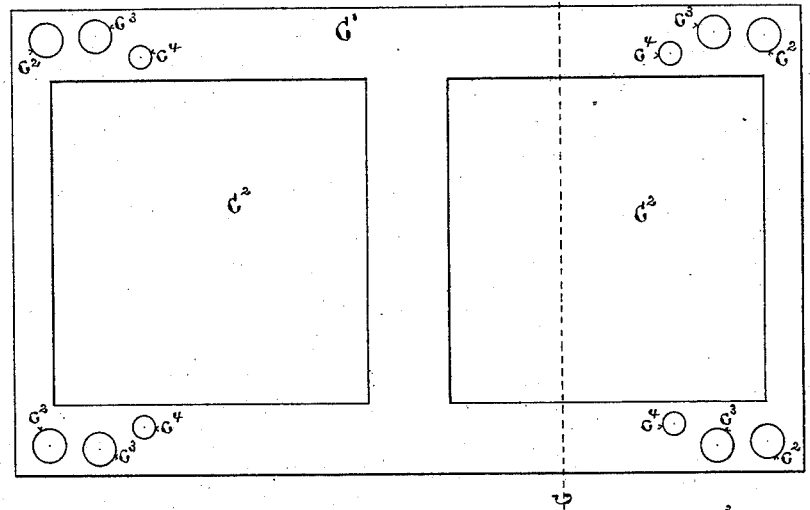
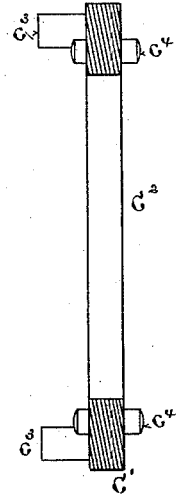
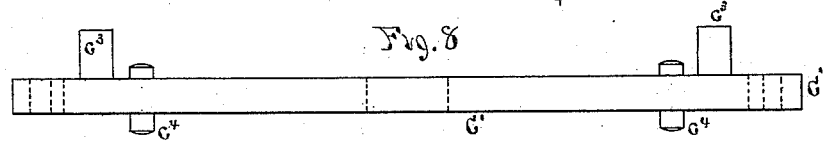
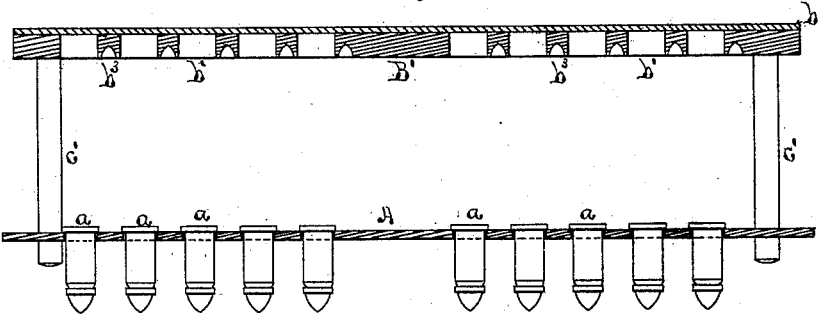
Witnesses
Wm S. Brown
N. P. Ockington.
Inventor
Paul Butler
By David Hawkins
Atty.
N. PETERS. Photo-Lithographer, Washington, D. C.

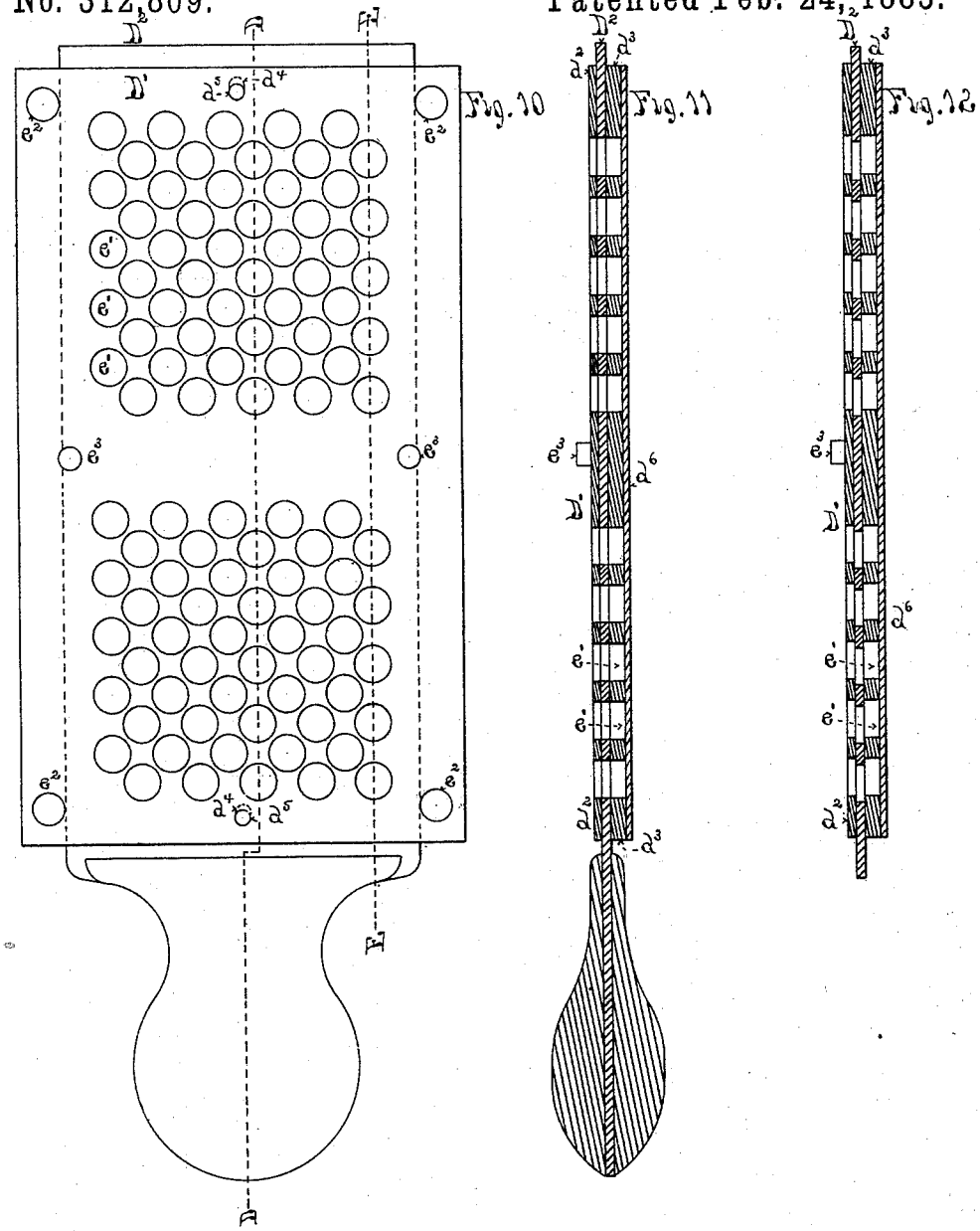

(No Model.) 5 Sheets—Sheet 5.
P. BUTLER.
IMPLEMENT FOR PACKING CARTRIDGES.
No. 312,809. Patented Feb. 24, 1885.

Witnesses
Wm. D. Brown
N. P. Ockington.

Inventor
Paul Butler
By David Hall Rice
Atty

UNITED STATES PATENT OFFICE.

PAUL BUTLER, OF LOWELL, MASSACHUSETTS.

IMPLEMENT FOR PACKING CARTRIDGES.

SPECIFICATION forming part of Letters Patent No. 312,809, dated February 24, 1885.

Application filed January 15, 1883. (No model.)

*To all whom it may concern:*

Be it known that I, PAUL BUTLER, of the city of Lowell, in the county of Middlesex and State of Massachusetts, have invented a new and useful Improvement in Mechanism for Packing Cartridges, of which the following is a specification.

My invention relates to the packing of metallic cartridges in boxes in which they are transported and sold in the market; and it consists of the series of novel tools or implements, substantially as hereinafter described.

Figure 13:
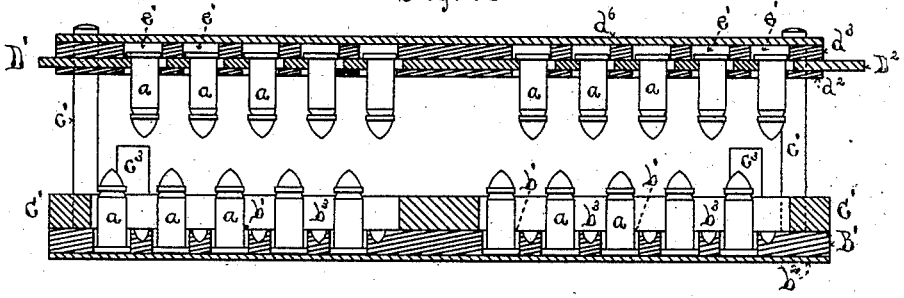
Figure 14:
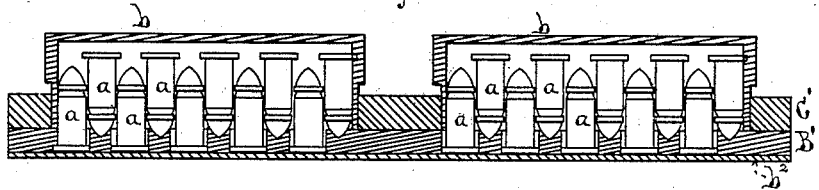

In the drawings, Figure 1 shows an implement used for lubricating the bullet ends of the cartridges, which I have so modified as to enable it to be used in performing the first step in the process of packing them. Fig. 2 is an edge view of same. Fig. 3 is a face view of the second implement I have devised to be used in conjunction with that shown in Fig. 1. Fig. 4 is a transverse section of the same. Fig. 5 is a side view of same. Fig. 6 is a face view of a third implement to be used in combination with that shown in Fig. 3 in the packing process. Fig. 7 is a transverse section of the same. Fig. 8 is a side view of the same. Fig. 9 is a longitudinal vertical section of the implements shown in Figs. 1 and 3 as they are being used in the packing process. Fig. 10 is a face view of another implement used in the packing process. Fig. 11 is a longitudinal section of the same through line D D. Fig. 12 is a longitudinal section of the same through line E E, showing the slide in a different position. Fig. 13 is a longitudinal section of the implement shown in Figs. 3 and 10 while being used for packing the cartridges. Fig. 14 represents the implement shown in Fig. 3, with the box in the act of being applied thereto in the final step of the packing process. Fig. 15 represents a face view of the cartridge-box with the cartridges packed therein ready for the market. Fig. 16 represents a transverse section through the box, divided on line B B.

Heretofore it has been customary to pack large sizes of cartridges in paper boxes containing one hundred cartridges each, the said cartridges being packed in the box in rows, with the heads and points alternately up and down, as shown in Figs. 15 and 16, in which *a a* represent the cartridges packed, and *b* represents the box ready to put the cover on. These cartridges have been always thus packed by hand one at a time, it having been supposed to be impossible to pack them in any more expeditious manner. The smaller cartridges have been thrown loosely into boxes without packing, owing to the difficulty and expense of so packing them.

By my invention I am not only enabled to pack the large cartridges more rapidly, but also to pack the small cartridges in the same manner, and thus insure their safety of transportation and more attractive appearance when put on sale, as well as a saving in space and expense in boxing. I am also enabled to prevent the grease which is applied to the ball part of the cartridge from being rubbed against the metallic-shell part and causing greater difficulty in inserting and withdrawing the same from the chamber of the fire-arm, the grease only being required upon the ball part and not upon the metallic-shell part for use.

Fig. 1 shows a plate, A, having a series of holes through it, *a'*, into which the cartridges are inserted so that the heads will rest upon the plate and the cylindrical case just fill the holes in the position shown in Fig. 9. This plate is used to grease the ball parts of the cartridges after the holes in it are filled with them by holding it over a dish of melted lubricant with the balls downward and lowering these balls into the tallow. Plates with similar holes have heretofore been used for this purpose; but my improvement in the plate A consists in arranging the holes in regular order and at such distances apart as that when the cartridges are in them they will occupy the same position with relation to each other as they do when packed in the box shown in Figs. 15 and 16, and having their heads all in the same direction—that is, I mean the cartridges in the box having their heads all upward are in the same position as when in the holes in plate A, and the cartridges in the box having their heads all downward are in the same position—whence it follows that the cluster of holes *a'*, &c., on each side of the central line of the plate A contain just one-half the number of cartridges necessary to fill the box, the plate A being designed to be used in packing two boxes simultaneously. It will be observed that this arrangement of the holes $a'$ requires that the rows parallel to the sides of the plate A shall have their holes come opposite to the spaces between the holes in the adjacent rows, and that the distance between the holes in each of these rows both ways of the plate shall be equal to the diameter of the hole. This arrangement of the holes in alternating rows is essential to the subsequent processes of the packing operation. I further improve the plate A by making in it holes $c$, for the introduction of guide-rods, substantially as hereinafter described.

In Figs. 3, 4, and 5 is shown a plate, B', having in it holes $b'$, extending through it to the cap-piece $b^2$, which is secured to the lower side of the plate, thus forming recesses in the plate. These recesses may be formed by counterboring into the plate B', without going entirely through it, if desired. These recesses $b'$ are of just the diameter to receive the heads of the cartridges and allow them to rest down upon the plate $b^2$ in the manner shown in Fig. 13 when the cartridges are placed in the recesses as there shown. The series of recesses $b'$ $b'$ are in the same position with relation to each other that the heads of the cartridges are when inserted in the holes $a'$ of the plate A, and the plate B' has a double series of these holes, like the plate A, for packing two boxes at once.

Between the recesses $b'$ in the plate B' is another series of recesses, $b^3$, made of the shape of the points of the bullets of the cartridges, the purpose of which will be hereinafter explained. The plate B' is provided with posts $c'$ at its corners, which fit into the holes $c$ in the plate A, so as to slide in them when inserted as shown in Fig. 9.

C', Figs. 6, 7, 8, is a frame-work made with square holes $C^2$ in it and with round holes $c^2$ at its corners, so arranged as to fit upon the posts $c'$ of the plate B' and slide down upon them when the frame C' comes into the position shown in Fig. 13. The holes $C^2$ in this frame, when in this position, just surround the cartridges, leaving space enough to apply the box, as shown in Fig. 14, when they are ready for it. Short upright posts $c^3$ are fixed in the frame C', and extend a short distance above it, for the purpose hereinafter described. Short studs $c^4$ are also fixed in the frame C', which fit snugly into holes $c^5$ in plate B' when they are placed together, as hereinafter described.

D', Figs. 10, 11, 12, represents an instrument which consists of the following parts: Two plates, $d^2$ $d^3$, have holes $e'$ $e'$ drilled through them exactly opposite to each other, of sufficient diameter to just receive the heads of the cartridges freely. The plates $d^2$ $d^3$ are secured together so that the holes $e'$ in each come directly opposite each other, the plates having their surfaces opposite to each other held apart and parallel by narrow strips of metal about three thirty-seconds of an inch thick placed beteen them along their longest sides. These strips of metal are about five-sixteenths of an inch in width, and are secured in place by rivets passing through the plates $d^2$ $d^3$ and themselves. They extend inward from the edges of the plates $d^2$ $d^3$ far enough to form side guides for the plate $D^2$, which is of such a thickness that it will just slide freely in the space between the plates $d^2$ $d^3$ when slipped into it. The plate $D^2$ has a series of holes through it exactly corresponding in position and size with the holes $e'$ in plates $d^2$ $d^3$. It also has two elongated holes through it, $d^4$, which slip freely on the pins $d^5$, passing through and fixed in the plates $d^2$ $d^3$. These holes and pins $d^4$ $d^5$ are in such a position that when the plate $D^2$, Fig. 11, is slipped as far to the right as possible the larger holes through the plate $D^2$ coincide with the holes $e'$ in the plates $d^2$ $d^3$; but when the plate $D^2$ is slipped as far as the pins and holes $d^4$ $d^5$ will permit to the left, Fig. 11, the larger holes in the plate $D^2$ will be drawn slightly out of coincidence with the holes $e'$ and prevent a cartridge-head passing through the latter.

$d^6$ is another plate, secured to the lower side or face of the plate $d^3$, to form of the holes $e'$ receptacles or cavities with flat bottoms, on which the cartridge-heads may abut when inserted in the holes $e'$, as shown in Fig. 13, in which latter figure the cartridges are shown as secured in the instrument or holder D' by the plate $D^2$ being slipped so as to prevent their escape from the holes or cavities $e'$. Through the corners of the holder D' are made holes $e^2$, which fit and slide freely upon the studs $c'$ of the plate B' when the holder and plate are applied together, as shown in Fig. 13. Two studs, $e^3$, are made to project slightly above the plate $d^2$ of the holder D', which fit into the holes $c^2$ in the plate A, and serve to bring the holes $a'$ in this plate over the corresponding holes or cavities, $e'$, in the holder D' when the cartridges are transferred from plate A to the holder D', as hereinafter described.

The process of using the instruments described for packing cartridges is as follows: The cartridges are first inserted into the holes of plate A points downward, as shown in Fig. 9, and having had their bullets dipped in melted tallow, as above described, while in this plate, substantially as has heretofore been done, the plate B' is slipped upon the plate A by inserting the posts $c'$ in the holes $c$ of the latter, so that the cavities $b'$ will exactly come over the heads of the cartridges, as shown in Fig. 9. When the plates B' and A are thus placed together, they are inverted or turned over, and by slightly shaking the plate A the cartridges will settle down into the cavities $b'$ in the plate B', with their heads resting upon the plate $b^2$, substantially as shown in Fig. 13. The plate A is then lifted away from the plate B', leaving the cartridges standing points upright in this position, which is the position they are to have in the box when packed. The holes $a'$ of the plate A are again filled with cartridges, and, after dipping in tallow, as before, the holder D', having its parts in the position shown in Figs. 10 and 11, is placed over the plate A, so that its studs $e^3$ will enter the holes $c^2$, and its holes or cavities $e'$ will come over the heads of the cartridges. These plates are then in like manner inverted, and, by slightly jarring the plate A, the cartridges will be left standing points upward in the holes or cavities $e'$ when the plate A is lifted off of $d^2$. The slide $D^2$ is now drawn into the position shown in Figs. 12 and 13, thus securing the cartridges in the holder D′, so that they may be turned points downward, as shown in Fig. 13, without dropping out. The frame C′ is now placed upon the plate B′ by inserting the studs $c'$ of the latter into the holes $c^2$ of the former and slipping them together. Next the holder D′ is inverted and its holes $e^2$ slipped upon the studs $c'$, as shown in Fig. 13, and is dropped down until its face-plate $d^2$ rests upon the top of studs $c^3$, when the points of the cartridges in the holder will enter the cavities $b^3$ between the cartridges in the plate B′ and be in the position in which they are to be packed in the box. The slide $D^2$ of the holder is now slipped back to the position shown in Figs. 10 and 11, so as to allow the holder, by jarring slightly on its top, to be lifted off the cartridges and studs $c'$, leaving the cartridges in the position shown in Fig. 14. The box $b$ is then taken and inverted and slipped over the cartridges, as shown in Fig. 14, down within the frame C′, and the box and frame are inverted, when, by slightly jarring the frame and plate B′ and withdrawing it from the box, the cartridges will be found packed in the box in the most perfect manner. Although this operation is somewhat tedious to describe, it is very quickly performed in practice, as its several movements, when once learned, are exceedingly simple, and no handling of the cartridges by hand is required after they are placed in the holder A to have their bullets greased, as has heretofore been necessary.

It is obvious that the form of the tools described by me may be somewhat varied, and the several steps of the process may have their order somewhat varied, without departing from the spirit of my invention. Thus the cartridges may be placed in the holder D′ first and in the plate B′ afterward. The small cavities $b^3$ in the plate B′ may also be omitted, and the slide $D^2$ may be made to work on the outer surface of the plate $d^2$ or the plate $d^3$. Again, the plate $d^2$ may be omitted, and the slide $D^2$ be made to operate with the plate $d^3$ in suitable guideways on the latter; but I prefer the construction I have described. The guide studs and holes may also be omitted, if desired.

I do not claim in this specification any further or other device or combination of devices than is set forth hereinafter in the claim, as all the other devices and combinations thereof and the process of packing cartridges of my invention as herein described are the subjects of another application for a patent which I have made and filed in the Patent Office March 1, 1884, Serial No. 122,606. The said instrument and process claimed in said other application are herein set forth and described, to show how the combination herein claimed is practically used.

What I claim as new and of my invention is—

In combination with the holder D′, having a series of holes or cavities, $e'$, adapted to receive the cartridge-heads, the sliding plate or gripper $D^2$, provided with a corresponding series of holes, substantially as described.

PAUL BUTLER.

Witnesses:
  DAVID HALL RICE,
  WILLIS FARRINGTON.